United States Patent
Imanishi et al.

(10) Patent No.: US 6,743,283 B2
(45) Date of Patent: Jun. 1, 2004

(54) BLUE LUMINOUS INK COMPOSITION

(75) Inventors: Keishi Imanishi, Minoh (JP); Yasuhiro Yamasaki, Neyagawa (JP)

(73) Assignee: Orient Chemical Industries, Ltd., Osaka-fu (JP)

(*) Notice: Subject to any disclaimer, the term of this patent is extended or adjusted under 35 U.S.C. 154(b) by 54 days.

(21) Appl. No.: 10/231,104

(22) Filed: Aug. 30, 2002

(65) Prior Publication Data

US 2003/0110979 A1 Jun. 19, 2003

(30) Foreign Application Priority Data

Aug. 31, 2001 (JP) .................................. 2001-263925

(51) Int. Cl.[7] ................................................ C09D 11/00
(52) U.S. Cl. ................................ 106/31.14; 106/31.15; 252/301.16
(58) Field of Search ............................ 106/31.14, 31.15; 252/301.16

(56) References Cited

U.S. PATENT DOCUMENTS 3,567,932 A * 3/1971 Alburger ..................... 250/302
2003/0106460 A1 * 6/2003 Imanishi et al. ........... 106/31.14

FOREIGN PATENT DOCUMENTS

| JP | 2000144029 A | 5/2000 |
| JP | 2000160083 A | 6/2000 |
| JP | 2000248219 A | 9/2000 |

OTHER PUBLICATIONS

Fukushima et al., Chemical Abstracts, vol. 134, No. 21, Abs. No. 297321p, (2001).

Yamamoto et al., Chemical Abstracts, vol. 132, No. 26, Abs, No. 349117g, (2000).

* cited by examiner

*Primary Examiner*—Helene Klemanski
(74) *Attorney, Agent, or Firm*—Birch, Stewart, Kolasch & Birch, LLP (57) ABSTRACT

Disclosed is a blue luminous ink composition comprising a luminous compound represented by the formula:

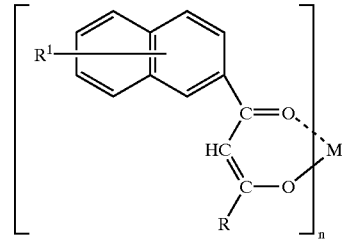

(I)

wherein $R^1$ is a group selected from the group consisting of a hydrogen atom, an alkyl group having from 1 to 4 carbon atoms, an alkoxyl group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 4 carbon atoms, a substituted or unsubstituted aralkyl group having from 7 to 10 carbon atoms and a substituted or unsubstituted aryl group having from 6 to 12 carbon atoms, M is a two-valent or three-valent metal, provided rare-earth metal and alkaline earth metal (IIa group) are eliminated, and n is an integer of 2 or 3. The blue luminous ink composition exhibits satisfactory emission intensity under ultraviolet irradiation.

7 Claims, 4 Drawing Sheets

BLUE LUMINOUS INK COMPOSITION

BACKGROUND OF THE INVENTION

1. Field of the Invention

The present invention relates to a luminous ink composition which emit light when exposed to ultraviolet rays, specifically relates to a blue luminous ink composition.

2. Description of the Related Art

In recent years, the term "functional organic compound" has come to be employed and organic substances for use in electronic or optical devices are actively studied. Of such substances, luminous compounds showing a photoluminescence (PL) phenomenon are known.

One application of the luminous compounds is security ink. The security ink is an ink such that a handwriting is invisible under visible light, however it becomes visible under irradiation of specific light or the handwriting emits light when it is irradiated with ultraviolet rays, e.g., a black light lamp, and one can read the recorded information.

The security ink is used for the purpose of preventing forgery or reproduction or of recording secret information. For instance, if lot numbers or codes of items are recorded with a security ink, it becomes easy to trace the distribution channels of the items or to prevent production or distribution of counterfeit products, and the fear of manipulation or damage of recorded information is reduced because the information is invisible under visible light.

Conventionally, a red luminous ink composition having europium complex has been mainly proposed as a security ink of this type, as described in Japanese Patent Kokai Publication No. 2000-144029, and No. 2000-160083 and the like.

In Japanese Patent Kokai Publication No. 2000-144029, proposed is an ink composition with the following features: being substantially invisible within the visible light region; containing europium (Eu) complex having an emission center wavelength at 615±20 μm when being excited with ultraviolet rays; containing a polyvinyl resin; containing, as a neutral ligand, at least a phosphoric acid type compound selected from a phosphine oxide compound, a phosphine sulfide compound and a phosphine compound; and containing not less than 94% of water and/or ethanol in a solvent.

In Japanese Patent Kokai Publication No. 2000-160083, proposed is an ink composition for ink jet printing containing, as a luminous material, from 0.001 to 5% by weight of 4,4,4-trifluoro-1-(2-thienyl)-1,3-butanedionate europium chelate compound and also containing not less than 70% by weight of an alcohol solvent as a solvent.

On the other hand, as to a blue luminous ink composition, a fluorescent brightening agent has been generally used for a luminous compound. For example, Japanese Patent Kokai Publication No. 2000-248219 describes a hot-melt type stealth ink composition which employs a fluorescent brightening agent "UVITEX-OB (trade name)" available from Ciba Specialty Chemicals Ltd (example 2).

However, the conventional rare-earth metal complexes which has beta-diketones as a ligand are rather expensive due to the presence of rare-earth metal, and are not suitable for practical use.

SUMMARY OF THE INVENTION

The inventors of the present invention have investigated into an ink composition containing a metal complex (e.g., aluminium complex, or indium complex) having specific beta-diketones as a ligand. As a result, it has been found that a blue luminous ink composition which shows fluorescent strength, visibility and fastness high enough to practical use is available by employing the metal complex, and the present invention has been completed.

The present invention provides a blue luminous ink composition comprising the luminous compound represented by the formula:

(I)

wherein $R^1$ is a group selected from the group consisting of a hydrogen atom, an alkyl group having from 1 to 4 carbon atoms, an alkoxyl group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 4 carbon atoms, a substituted or unsubstituted aralkyl group having from 7 to 10 carbon atoms and a substituted or unsubstituted aryl group having from 6 to 12 carbon atoms, M is a two-valent or three-valent metal, provided that rare-earth metal and alkaline earth metal (IIa group) are eliminated, and n is an integer of 2 or 3.

The blue luminous ink composition is substantially invisible under visible light, however it shows intense emission colour within the blue region under ultraviolet rays. Therefore, the blue luminous ink composition is useful for printing a blindfold mark, bar-code or the like on office documents and various containers.

DETAILED DESCRIPTION OF THE INVENTION

The luminous compound contained in the blue luminous ink composition of the present invention is a complex compound in which two or three molecules of the specific 1,3-diketone derivative having 2-naphthyl group are coordinated to two-valent or three-valent metal. The luminous compound is substantially colorless under the visible light, whereas it has absorption in the ultraviolet wavelength region. Therefore, being excited with ultraviolet rays, it shows intense emission of light having a wavelength around blue to blue-green (465±15 nm). In addition, the compound shows fastness which is excellent enough to use as a fluorescent developer for an ink composition.

The luminous compound preferred to be employed in the present invention is the compound having structure as shown in formula (1). In formula (I), the substituent $R^1$ of 2-naphthyl group may be an alkyl group, an alkoxyl group or a halogen atom. More specifically, $R^1$ is selected from the group consisting of an alkyl group having from 1 to 4, preferably from 1 to 2 carbon atoms, an alkoxyl group having from 1 to 4, preferably from 1 to 2 carbon atoms and a halogen atom.

Specific examples of the 2-naphthyl group include 2-naphthyl group, a 2-naphthyl group substituted with an alkyl group having from 1 to 4 carbon atoms such as 1-methyl-2-naphthyl group, 3-methyl-2-naphthyl group, 4-methyl-2-naphthyl group, 5-methyl-2-naphthyl group, 6-methyl-2-naphthyl group, 7-methyl-2-naphthyl group, 8-methyl-2-naphthyl group and 4-ethyl-2-naphthyl group; a 2-naphthyl group substituted with an alkoxyl group having from 1 to 4 carbon atoms such as 1-methoxy-2-naphthyl group, 3-methoxy-2-naphthyl group, 4-methoxy-2-naphthyl group, 5-methoxy-2-naphthyl group, 6-methoxy-2-naphthyl group, 7-methoxy-2-naphthyl group, 8-methoxy-2-naphthyl group and 6-ethoxy-2-naphthyl group; and a 2-naphthyl group substituted with halogen.

R in formula (1) may be a fluorine-containing alkyl group having from 1 to 20 carbon atoms such as $CF_3$ group, $CHF_2$ group, $CH_2F$ group, $C_2F_5$ group, $CH(CF_3)_2$ group, $CF_2CF_2CF_3$ group, $C_7F_{15}$ group or $C_nF_{2n+1}$ (wherein n is an integer of from 1 to 20); an alkyl group having from 1 to 4 carbon atoms such as methyl group, ethyl group and iso-propyl group; an aralkyl group having from 7 to 10 carbon atoms such as benzyl group and benzyl group substituted with fluorine atom; a phenyl group; a phenyl group having from 6 to 10 carbon atoms substituted with fluorine atom or alkyl group; and an aryl group having from 10 to 12 carbon atoms such as naphthyl group. R is preferably $CF_3$ group in general, and, especially, is preferably a perfluoroalkyl group having from 1 to 20 carbon atoms such as $C_nF_{2n+1}$ group (wherein n is an integer of from 1 to 20) and a perfluoroalkyl group having from 1 to 10 carbon atoms.

M in formula (I) is a two-valent or three-valent metal. Provided that M is different from rare-earth metal and alkaline earth metal (IIa group) of the elemental periodic table. M is preferably the IIIb group metal of the elemental periodic table, more preferably aluminium, indium or zinc.

Specific examples of the luminous compounds preferred to be employed in the present invention are as follows:

(II)

(III)

(IV)

(V)

(VI)

(VII)

-continued

(VIII)

(IX)

(X)

(XI)

(XII)

The luminous compound (I) employed in the present invention can readily be obtained by heating and mixing a β-diketone derivative, for example 4,4,4-trifluoro-1-(2-naphthyl)-1,3-butanedione (3 mol) and a metal compound, for example aluminium chloride or indium chloride (1 mol) in the presence of 1 N NaOH in an organic solvent (e.g., ethanol).

The resulting luminous compound is a colorless powder and is employed as an ultraviolet excitation type fluorescent developer for the ink composition of the present invention.

The ink composition of the present invention can be obtained by dissolving this luminous compound in a liquid medium (preferably those selected from an alcohol solvent, a ketone solvent, and an ester solvent, employed as a main solvent) and optionally mixing therewith ingredients usually contained in an ink composition, such as binder resins and various types of surfactants.

The luminous compound is blended in an amount such that concentration of the luminous compound based on the total weight of an ink composition becomes from 0.001 to 5% by weight, preferably from 0.01 to 3% by weight. If the concentration of the luminous compound in an ink composition is less than 0.001% by weight, light emission becomes small and it becomes difficult to read the emission. If the concentration exceeds 5% by weight, self-absorption may occur and the emission intensity is reduced.

The solvent to be employed in the blue luminous ink composition of the present invention is not limited to and may be any organic solvent so that the luminous compound is dissolved or finely dispersed in the solvent. For example, when adverse effects on the environment such as odor are took into consideration, an alcohol solvent is preferred. Specific examples of the alcohol solvent include aliphatic alcohol such as methanol, ethanol, propanol, isopropanol and mixtures thereof If the luminous compound is insufficiently dissolved in the alcohol solvent, an ester solvent such as ethyl acetate or a ketone solvent may optionally be added to the alcohol solvent.

The preferred solvent includes an alcohol solvent which dissolves the luminous compound, a mixture of an alcohol solvent with an ester solvent such as ethyl acetate, a mixture of an alcohol solvent with a ketone solvent, a mixture of these solvents with water, and the like.

It is preferred that the alcohol solvent and the ester solvent are employed as a main solvent. This is because the alcohol solvent and the ester solvent are excellent in dissolving ability of the luminous compound employed in the present invention, and the resulting ink composition improves in stability. The main solvent refers to the solvent contained in the solvent mixture in an amount of not less than 50% by weight.

The combination amount of the solvent to be blended in the ink composition is preferably not less than 60% by weight based on the total weight of the ink composition of the present invention.

Further, for the purpose of improving stability of ink or preventing ink from drying at a pen tip or a nozzle, the blue luminous ink composition of the present invention may include a high boiling point solvent. Examples of the high boiling point solvent include an ether solvent such as ethylene glycol monomethyl ether, ethylene glycol monoethyl ether and propylene glycol monomethyl ether (monohydric alcohol solvents), a glycol solvent such as ethylene glycol, diethylene glycol and propylene glycol (dihydric alcohol solvents), or a polyol such as 1,2-hexanediol and 2,4,6-hexanetriol. The additional amount thereof is preferably from 0 to 30% by weight based on the total weight of the ink composition of the present invention.

The blue luminous ink composition of the present invention may optionally contain additional solvents if necessary for dissolving the luminous compound. Examples of the additional solvent include a ketone solvent such as acetone, methyl ethyl ketone, methyl isobutyl ketone, cyclohexanone and 4-methoxy-4-methylpentanone, a hydrocarbon solvent such as cyclohexane, methyl cyclohexane, n-pentane, n-hexane and n-heptane, an ester solvent such as ethyl acetate and n-propyl acetate, dimethyl sulfoxide, n-methyl-2-pyrrolidone, γ-butyrolactone, toluene, xylene and the like. These solvents are employed in alone or in combination of two or more.

In the blue luminous ink composition of the present invention, a binder resin is included in order to fix the luminous compound properly. It is preferred that the binder resin has good solubility to the solvent, and that viscosity of the ink composition is suitably adjusted when the binder resin is included in the ink composition. Specific examples of the preferred binder resins include the resins listed below: a polyvinyl resin such as polyvinyl alcohol, polyvinyl butyral, polyvinyl pyrrolidone, vinyl pyrrolidone-vinyl acetate copolymers; a polyamine resin such as polyallylamine, polyvinylamine and polyethyleneimine; a polyacrylate resin such as polymethyl acrylate, polyethylene acrylate, polymethyl methacrylate and polyvinyl methacrylate; and an amino resin, an alkyd resin, an epoxy resin, a phenol resin, a polyesterimide resin, a polyamide resin, a polyamideimide resin, a silicone resin, a phenol resin, a ketone resin, rosin, a rosin-modified resin phenol, maleic acid, fumaric acid resin, etc.), a petroleum resin, a cellulose resin such as ethyl cellulose and nitrocellulose, and a natural resin (gum arabic, gelatin, etc.)

Particularly preferred binder resins include a polyvinyl resin, a polyacrylate resin, a polyamine resin, etc., which are usually employed for ink for writing implements, ink jet ink, and printing ink.

These binder resins are blended, for example, in an amount of from 0.5 to 30% by weight, preferably from 1 to 20% by weight based on the total weight of the ink composition. If the amount of the binder resin is less than 0.5% by weight, the luminous compound may not satisfactorily be fixed on impermeable recording materials. On the other hand, if the amount is over 30% by weight, the resulting ink composition may become poor in injection stability. Further, a binder layer may cover thickly around a luminous compound, emission of the luminous compound may be impaired by the binder resin.

In the case where a mixture of alcohol and water is employed as an alcohol solvent, some additives may be added such as various types of surfactants (e.g., an anionic, nonionic and cationic surfactants such as alkylsulfate, phosphate and polyoxyethylene alkyl ether and alkylamine salt; ampholytic surfactants, fluorine-containing surfactants, or acetylene glycol surfactants), a dispersant (e.g., rosin acid soap, stearic acid soap, oleic acid soap, Na-di-β-naphthylmethane disulfate, Na-lauryl sulfate and Na-diethylhexyl sulfosuccinate), or cyclodextrin (CD) (e.g., β-CD, dimethyl-β-CD, methyl-β-CD, hydroxyethyl-β-CD and hydroxypropyl-β-CD), antifoaming agents. These additives may be employed in an amount of from 0.5 to 5% by weight, preferably from 1 to 3% by weight based on the ink composition.

The blue luminous compound contained in the ink composition of the present invention shows solubility and well dispersibility to the above described solvents and/or resins, and emits light within the blue region (465 ±15 nm) when it is excited with ultraviolet rays (see Examples). For example, it is possible to excite a luminous compound of the present invention to emit light within the blue region by irradiating printed materials which are printed by an ink composition of the present invention with ultraviolet light (about 365 nm) using an ultraviolet lamp such as a black light lamp. Accordingly, secret information recorded with an ink composition of the present invention emits no light under visible light but emits blue light under ultraviolet light and, therefore, is useful as security ink.

The present invention will be described specifically with reference to Synthesis Examples and Examples below, but the invention is not restricted thereto.

EXAMPLES

Synthesis Example 1

7.98 g (0.03 mol) of 4,4,4-trifluoro-1-(2-naphthyl)-1,3-butanedione (manufactured by Tokyo Kasei Kogyo Co., Ltd.), 2.41 g (0.01 mol) of aluminium chloride hexahydrate (manufactured by Wako Pure Chemical Industries, Ltd.) and 30 ml of 1N sodium hydroxide were mixed in 100 ml of ethanol and the mixture was stirred with heating (at about 60° C. for about 3 hours) to obtain 7.0 g of luminous compound 1 of the structure illustrated below.

Synthesis Example 2

21.4 g (0.12 mol) of methyl pentafluoropropionate (manufactured by Lancaster Co.) and 17 g (0.10 mol) of 2-acetylnaphthalene (manufactured by Tokyo Kasei Kogyo Co., Ltd.) were allowed to react in the presence of 16.2 g (0.30 mol) of sodium methylate (manufactured by Wako Pure Chemical Industries, Ltd.) in 50 ml of dry ether to obtain 30 g of 4,4,5,5,5-pentafluoro-1-(2-naphthyl)-1,3-butanedione.

9.48 g (0.03 mol) of 4,4,5,5,5-pentafluoro-1-(2-naphthyl)-1,3-butanedione as obtained above, 2.41 g (0.01 mol) of aluminium chloride hexahydrate (manufactured by Wako Pure Chemical Industries, Ltd.) and 30 ml of 1N sodium hydroxide were mixed in 100 ml of ethanol and the mixture was stirred with heating (at about 60° C. for about 3 hours) to obtain 8.7 g of luminous compound 2 of the structure illustrated below.

Synthesis Example 3

7.98 g (0.03 mol) of 4,4,4-trifluoro-1-(2-naphthyl)-1,3-butanedione (manufactured by Tokyo Kasei Kogyo Co., Ltd.), 2.41 g (0.01 mol) of indium chloride anhydride (manufactured by Kishida Kagaku K.K.) and 30 ml of 1N sodium hydroxide were mixed in 100 ml of ethanol and the mixture was stirred with heating (at about 60° C. for about 3 hours) to obtain 7.0 g of luminous compound 3 of the structure illustrated below.

Synthesis Example of Comparative Compound 1

6.66 g (0.03 mol) of 4,4,4-trifluoro-1-(2-thienyl)-1,3-butanedione (manufactured by Tokyo Kasei Kogyo Co., Ltd.), 2.41 g (0.01 mol) of aluminium chloride hexahydrate (manufactured by Wako Pure Chemical Industries, Ltd.) and 30 ml of 1N sodium hydroxide were mixed in 100 ml of ethanol and the mixture was stirred with heating (at about 60° C. for about 3 hours) to obtain 5.5 g of comparative compound 1 of the structure illustrated below.

Synthesis Example of Comparative Compound 2

6.48 g (0.03 mol) of 4,4,4-trifluoro-1-phenyl-1,3-butanedione (manufactured by Tokyo Kasei Kogyo Co., Ltd.), 2.41 g (0.01 mol) of aluminium chloride hexahydrate (manufactured by Wako Pure Chemical Industries, Ltd.) and 30 ml of 1N sodium hydroxide were mixed in 100 ml of ethanol and the mixture was stirred with heating (at about 60° C. for about 3 hours) to obtain 5.2 g of comparative compound 2 of the structure illustrated below.

Synthesis Example of Comparative Compound 3

6.66 g (0.03 mol) of 4,4,4-trifluoro-1-(2-thienyl)-1,3-butanedione (manufactured by Tokyo Kasei Kogyo Co., Ltd.), 2.41 g (0.01 mol) of indium chloride anhydride (manufactured by Kishida Kagaku K.K.) and 30 ml of 1N sodium hydroxide were mixed in 100 ml of ethanol and the mixture was stirred with heating (at about 60° C. for about 3 hours) to obtain 5.4 g of comparative compound 3 of the structure illustrated below.

Example 1

In this Example, evaluation was carried out for luminous compounds 1 to 3 obtained in Synthesis Examples described above for use in the ink composition of the present invention and comparative example compounds 1 to 3. In the evaluation, 25 mg of each luminous compound was dissolved in 100 ml of ethanol and the fluorescence intensity (photoluminescence intensity) was measured with a spectrofluorometer (RF-5300PC manufactured by Shimadzu Corp.) In Table 1 are shown relative values of fluorescence intensity obtained by setting the fluorescence intensity of comparative example compound 3 equal to 100.

TABLE 1

| | Excitation Wavelength (nm) | Emission Center Wavelength (nm) | Relative Fluorescence Intensity |
|---|---|---|---|
| Luminous Compound 1 | 402 | 458 | 183 |
| Luminous Compound 2 | 403 | 455 | 227 |
| Luminous Compound 3 | 398 | 474 | 100 |
| Comp. Ex. Compound 1 | 387 | 446 | 9 |
| Comp. Ex. Compound 2 | 372 | 444 | 4 |
| Comp. Ex. Compound 3 | 234 | 475 | 8 |

Figure 1:
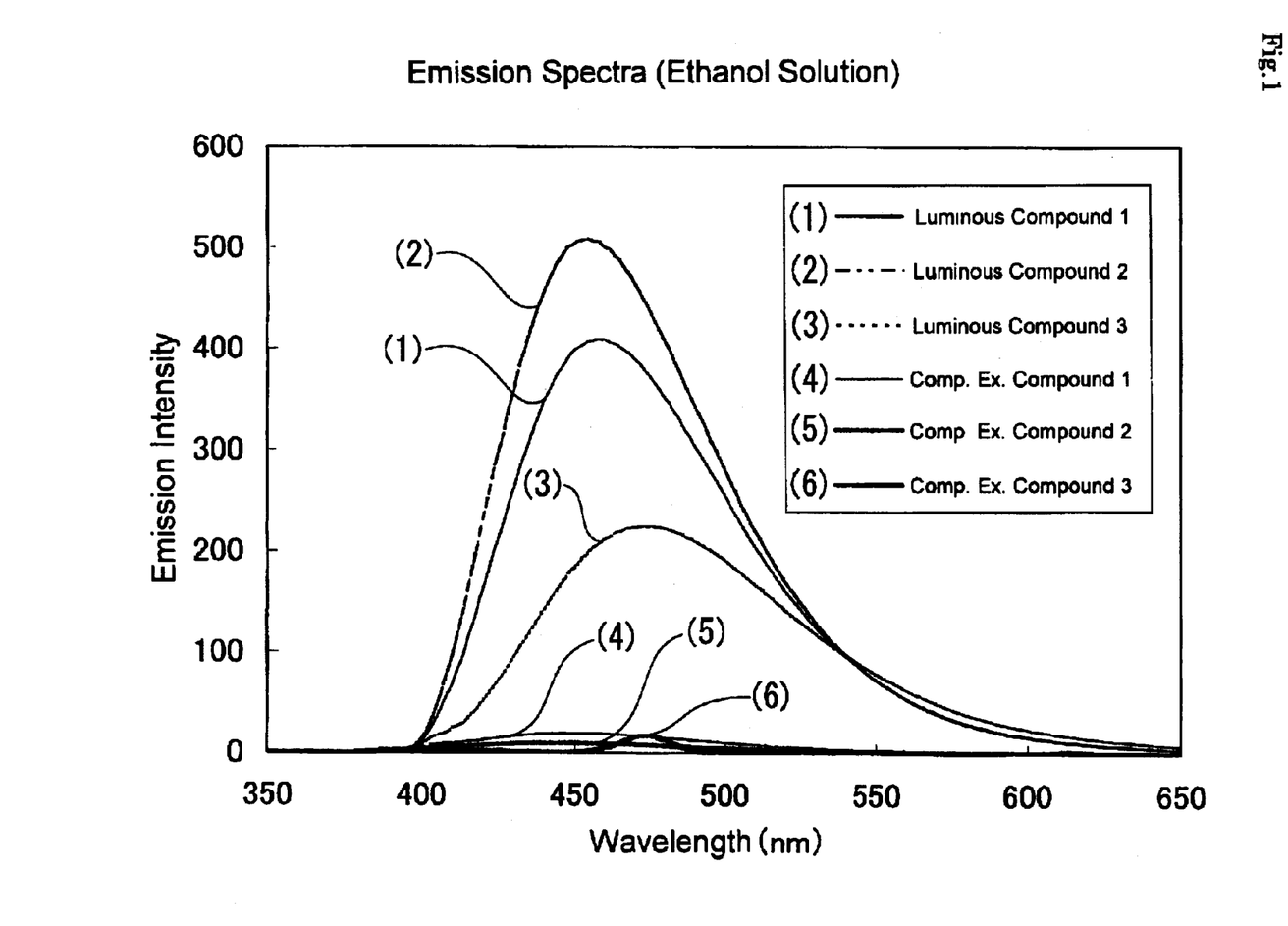
FIG. 1 shows the emission spectra in an ethanol solution of luminous compounds 1 to 3 obtained in synthesis examples, and comparative example compounds 1 to 3.
Figure 2:
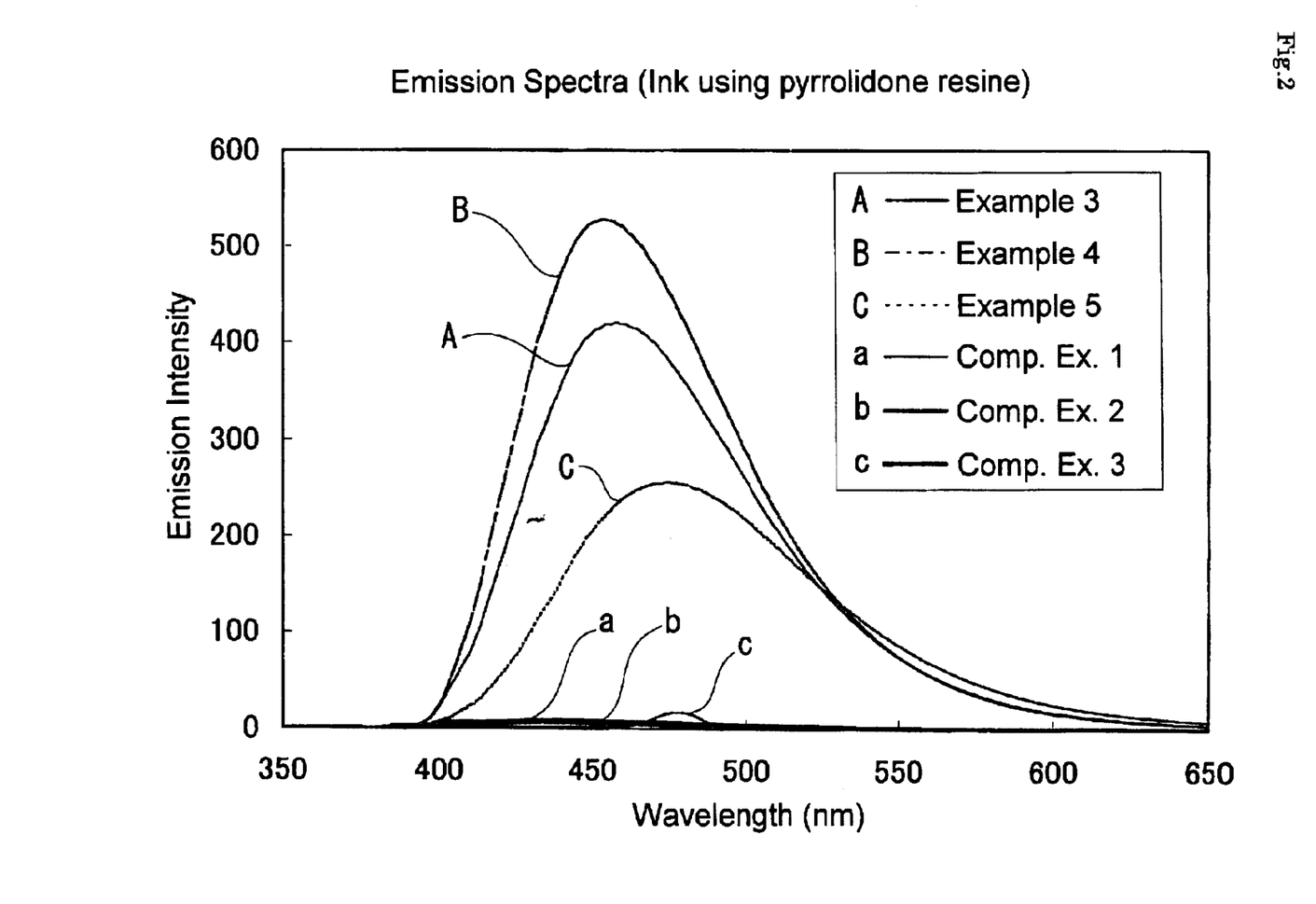
FIG. 2 shows the emission spectra of the ink compositions of Examples 3, 4, 5, Comparative Examples 1, 2, and 3 using a polyvinyl pyrrolidone resin (ink using a pyrrolidone resin).
Figure 3:
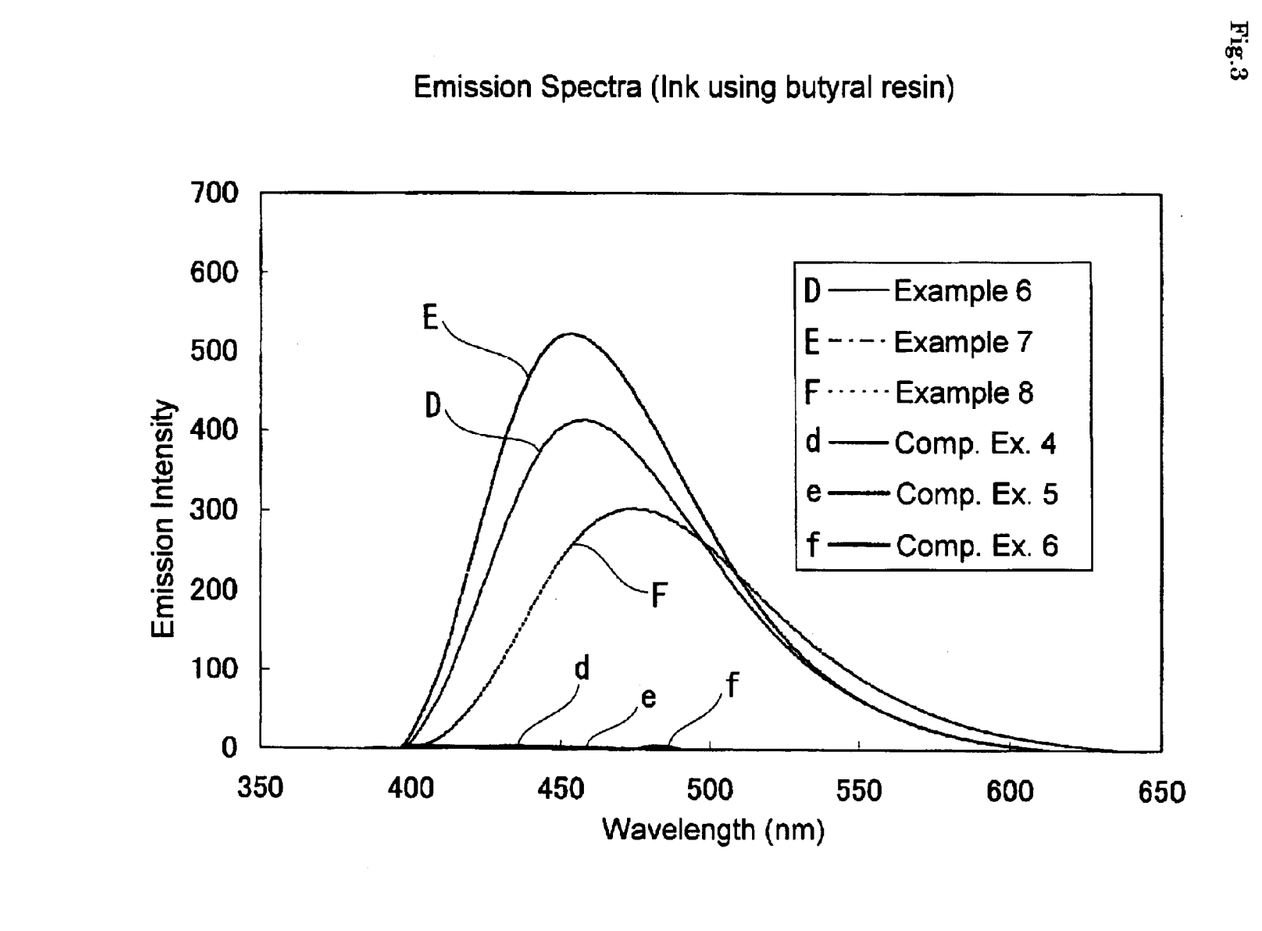
FIG. 3 shows the emission spectra of the ink compositions of Examples 6, 7, 8, Comparative Examples 4, 5, and 6 using a polyvinyl butyral resin (ink using a butyral resin).
Figure 4:
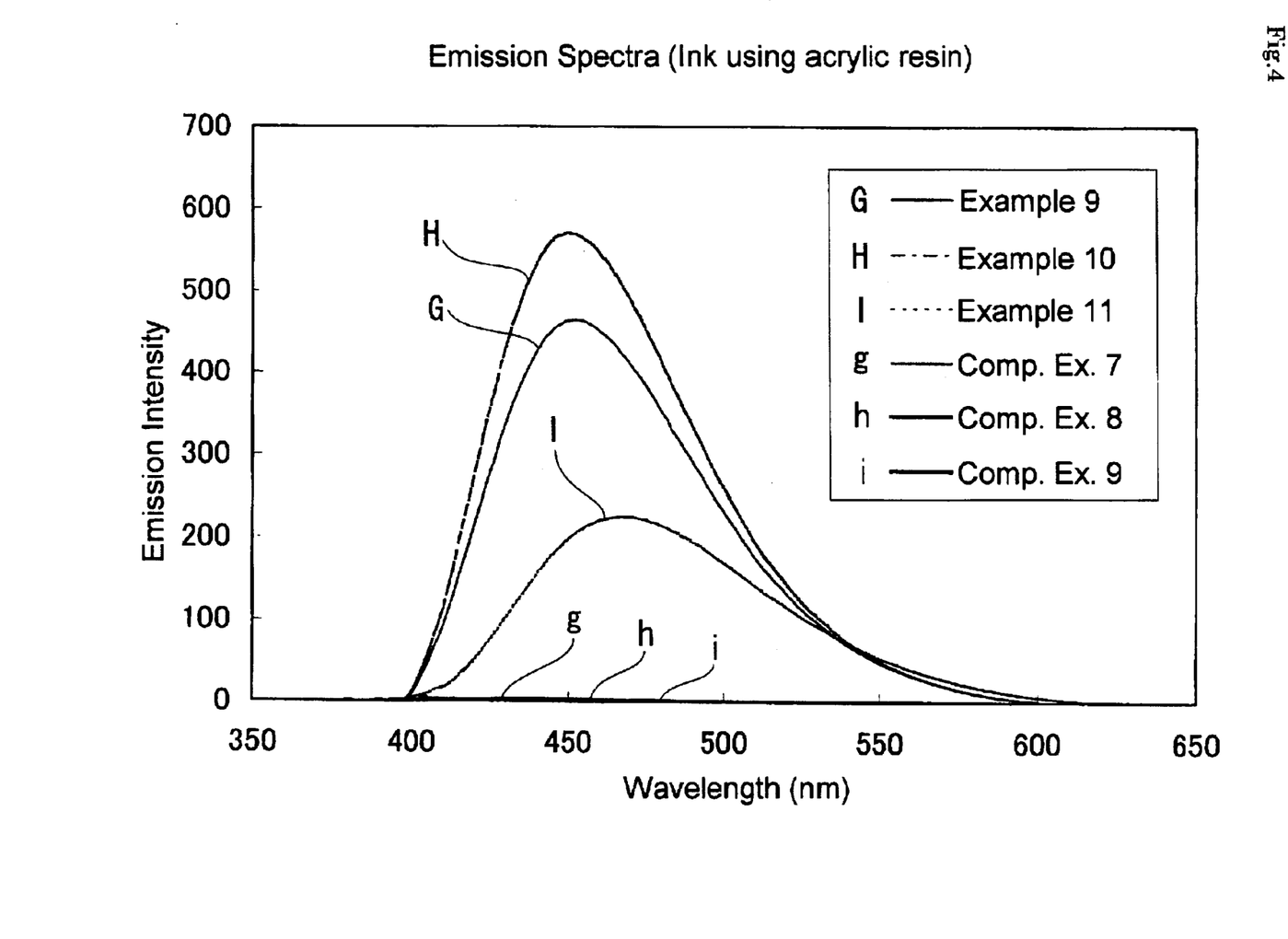
FIG. 4 shows the emission spectra of the ink compositions of Examples 9, 10, 11, Comparative Examples 7, 8, and 9 using a polyacrylate resin (ink using an acrylic resin).

FIG. 1 shows the emission spectra of luminous compounds 1 to 3 and comparative example compounds 1 to 3.

Example 2

Further, the luminous compounds were compared with respect to solubility to ethanol, ethyl acetate, and methyl ethyl ketone (MEK). In the measurement of solubility, each of the luminous compound was dissolved with heating in 100 ml of each solvent and was left stand at room temperature for 24 hours. Then the insoluble matter was removed by filtration and the solubility (g/100 ml solvent) was calculated. The results are shown in Table 2.

TABLE 2

| | Solubility (g/100 ml) | | |
|---|---|---|---|
| | Ethanol | Ethyl Acetate | MEK |
| Luminous Compound 1 | 0.30 | 5 or more | 5 or more |
| Luminous Compound 2 | 1.08 | 5 or more | 5 or more |
| Luminous Compound 3 | 0.32 | 5 or more | 5 or more |

TABLE 2-continued

| | Solubility (g/100 ml) | | |
|---|---|---|---|
| | Ethanol | Ethyl Acetate | MEK |
| Comp. Ex. Compound 1 | 0.35 | 4.75 | 4.79 |
| Comp. Ex. Compound 2 | 1.73 | 4.73 | 4.61 |
| Comp. Ex. Compound 3 | 1.27 | 5 or more | 5 or more |

In consideration of solubility as shown in Table 2, blue luminous ink compositions were prepared having the following combination ratio (ratio by weight).

Examples 3, 4, 5, Comparative Examples 1, 2 and 3 describe ink compositions in which the combination ratio of ethanol:ethyl acetate:ethylene glycol:polyvinyl pyrrolidone:luminous compound is 60:30:5:4:1 (ratio by weight).

Example 3

Luminous compound 1 (1 g) was dissolved in a solution of 60 g of ethanol, 30 g of ethyl acetate and 5 g of ethylene glycol, and 4 g of polyvinyl pyrrolidone [PVP K-15 (trade name) manufactured by IPS K.K.] was added thereto to prepare ink composition (A). Using an inkjet recorder [HG5130 manufactured by Seiko Epson Corp.], bar-code printing was done on plain paper. When the printed material was irradiated with ultraviolet light (about 365 nm) using a black light lamp, brilliant blue emission was observed (Table 3).

Example 4

Luminous compound 2 (1 g) was dissolved in a solution of 60 g of ethanol, 30 g of ethyl acetate and 5 g of ethylene glycol, and 4 g of polyvinyl pyrrolidone [PVP K-15 (trade name) manufactured by IPS K.K.] was added thereto to prepare ink composition (B). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 3).

Example 5

Luminous compound 3 (1 g) was dissolved in a solution of 60 g of ethanol, 30 g of ethyl acetate and 5 g of ethylene glycol, and 4 g of polyvinyl pyrrolidone [PVP K-15 (trade name) manufactured by IPS K.K.] was added thereto to prepare ink composition (C). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 3).

Comparative Examples 1 to 3

Ink compositions (a), (b) and (c) were prepared in the same manner as Example 3 except that comparative example compounds 1, 2 or 3 was employed respectively instead of luminous compound 1 employed in Example 3. Using each of the ink composition, bar-code printing was done in the same manner as Example 3. When the printed materials were irradiated with ultraviolet light (about 365 nm) using a black light lamp, no emission was observed. Results of the test for observing the bar-code images obtained from ink compositions (a), (b) and (c) were shown in Table 3.

Examples 6, 7, 8, Comparative Examples 4, 5 and 6 describe ink compositions in which the combination ratio of ethanol:ethyl acetate:ethylene glycol:polyvinyl butyral:luminous compound is 60:30:5:4:1 (ratio by weight).

Example 6

Luminous compound 1 (1 g) was dissolved in a solution of 60 g of ethanol, 30 g of ethyl acetate and 5 g of ethylene glycol, and 4 g of polyvinyl butyral [Elex BL-1 (trade name) manufactured by Sekisui Chemical Co., Ltd.] was added thereto to prepare ink composition (D). Using an inkjet recorder [HG5130 manufactured by Seiko Epson Corp.], bar-code printing was done on plain paper. When the printed material was irradiated with ultraviolet light (about 365 nm) using a black light lamp, brilliant blue emission was observed (Table 4).

Example 7

Luminous compound 2 (1 g) was dissolved in a solution of 60 g of ethanol, 30 g of ethyl acetate and 5 g of ethylene glycol, and 4 g of polyvinyl butyral [Elex BL-1 (trade name) manufactured by Sekisui Chemical Co., Ltd.] was added thereto to prepare ink composition (E). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 4).

Example 8

Luminous compound 3 (1 g) was dissolved in a solution of 60 g of ethanol, 30 g of ethyl acetate and 5 g of ethylene glycol, and 4 g of polyvinyl butyral [Elex BL-1 (trade name) manufactured by Sekisui Chemical Co., Ltd.] was added thereto to prepare ink composition (F). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 4).

Comparative Examples 4 to 6

Ink compositions (d), (e) and (f) were prepared in the same manner as Example 6 except that comparative example compounds 1, 2 or 3 was employed respectively instead of luminous compound 1 employed in Example 6. Using each of the ink composition, bar-code printing was done in the same manner as Example 6. When the printed materials were irradiated with ultraviolet light (about 365 nm) using a black light lamp, no emission was observed. Results of the test for observing the bar-code images obtained from ink compositions (d), (e) and (f) were shown in Table 4.

Examples 9, 10, 11, Comparative Examples 7, 8 and 9 describe ink compositions in which the combination ratio of ethanol:ethyl acetate:ethylene glycol:polyacrylate:luminous compound is 60:30:5:4:1 (ratio by weight).

Example 9

Luminous compound 1 (1 g) was dissolved in a solution of 60 g of ethanol, 30 g of ethyl acetate and 5 g of ethylene glycol, and 4 g of polyacrylate [NeoCry 1B-814 (trade name) manufactured by Avecia Limited] was added thereto to prepare ink composition (G). Using an inkjet recorder [HG5130 manufactured by Seiko Epson Corp.], bar-code printing was done on plain paper. When the printed material was irradiated with ultraviolet light (about 365 nm) using a black light lamp, brilliant blue emission was observed (Table 5).

Example 10

Luminous compound 2 (1 g) was dissolved in a solution of 60 g of ethanol, 30 g of ethyl acetate and 5 g of ethylene glycol, and 4 g of polyacrylate [NeoCry 1B-814 (trade name) manufactured by Avecia Limited] was added thereto to prepare ink composition (H). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 5).

Example 11

Luminous compound 3 (1 g) was dissolved in a solution of 60 g of ethanol, 30 g of ethyl acetate and 5 g of ethylene glycol, and 4 g of polyacrylate [NeoCry 1B-814 (trade name) manufactured by Avecia Limited] was added thereto to prepare ink composition (I). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed (Table 5).

Comparative Examples 7 to 9

Ink compositions (g), (h) and (i) were prepared in the same manner as Example 9 except that comparative example compounds 1, 2 or 3 was employed respectively instead of luminous compound 1 employed in Example 9. Using each of the ink composition, bar-code printing was done in the same manner as Example 9. When the printed materials were irradiated with ultraviolet light (about 365 nm) using a black light lamp, no emission was observed. Results of the test for observing the bar-code images obtained from ink compositions (g), (h) and (i) were shown in Table 5.

Example 12

Luminous compound 2 (1 g) was dissolved in 84 g of ethanol and 15 g of polyallylamine [PAA-L (trade name) which is a 20% aqueous solution having a weight average molecular weight of about 10,000 manufactured by Nitto Boseki Co., Ltd.] was added thereto to prepare ink composition (J). Using an inkjet recorder [HG5130 manufactured by Seiko Epson Corp.], bar-code printing was done on plain paper. When the printed material was irradiated with ultraviolet light (about 365 nm) using a black light lamp, intense brilliant blue emission was observed in the same manner as that composition (B) of Example 3.

Example 13

For investigating the emission intensity of each ink composition described above, each ink composition was diluted 50 times with a ethanol:ethyl acetate=2:1 (weight by ratio) solvent, and the fluorescence intensity (photoluminescence intensity) was measured using a spectro-fluorometer (RF-5300PC manufactured by Shimadzu Corp.) in the same manner as in Example 1. In Tables 3, 4 and 5 are shown relative values (%) of fluorescence intensities obtained by setting the fluorescence intensity of ink composition (C) of Example 5 equal to 100, emission center wavelength (nm), and evaluation by visual observation.

The evaluation criteria for the visual observation are as follows:

◎: Being visually recognized at a concentration of 0.001% by weight.

O: Being visually recognized clearly at a concentration of 0.01% by weight.

X: Being unable to be recognized visually.

TABLE 3

|  | Example | | | Comp. Ex. | | |
| --- | --- | --- | --- | --- | --- | --- |
|  | 3 | 4 | 5 | 1 | 2 | 3 |
| Ink Composition | A | B | C | a | b | c |
| Luminous Compound 1 | 1 |  |  |  |  |  |
| Luminous Compound 2 |  | 1 |  |  |  |  |
| Luminous Compound 3 |  |  | 1 |  |  |  |
| Comp. Ex. Compound 1 |  |  |  | 1 |  |  |
| Comp. Ex. Compound 2 |  |  |  |  | 1 |  |
| Comp. Ex. Compound 3 |  |  |  |  |  | 1 |
| Ethanol | 60 | 60 | 60 | 60 | 60 | 60 |
| Ethyl Acetate | 30 | 30 | 30 | 30 | 30 | 30 |
| Ethylene Glycol | 5 | 5 | 5 | 5 | 5 | 5 |
| Polyvinyl Pyrrolidone | 4 | 4 | 4 | 4 | 4 | 4 |
| Relative Fluorescence Intensity (%) | 164 | 204 | 100 | 3 | 2 | 7 |
| Emission Center Wavelength (nm) | 458 | 454 | 475 | 438 | 435 | 477 |
| Visual Observation | ◎ | ◎ | O | X | X | X |

TABLE 4

|  | Example | | | Comp. Ex. | | |
| --- | --- | --- | --- | --- | --- | --- |
|  | 6 | 7 | 8 | 4 | 5 | 6 |
| Ink Composition | D | E | F | d | e | f |
| Luminous Compound 1 | 1 |  |  |  |  |  |
| Luminous Compound 2 |  | 1 |  |  |  |  |
| Luminous Compound 3 |  |  | 1 |  |  |  |
| Comp. Ex. Compound 1 |  |  |  | 1 |  |  |
| Comp. Ex. Compound 2 |  |  |  |  | 1 |  |
| Comp. Ex. Compound 3 |  |  |  |  |  | 1 |
| Ethanol | 60 | 60 | 60 | 60 | 60 | 60 |
| Ethyl Acetate | 30 | 30 | 30 | 30 | 30 | 30 |
| Ethylene Glycol | 5 | 5 | 5 | 5 | 5 | 5 |
| Polyvinyl Butyral | 4 | 4 | 4 | 4 | 4 | 4 |
| Emission Intensity (%) | 136 | 172 | 100 | 0 | 0 | 0 |
| Emission Center Wavelength (nm) | 458 | 453 | 475 | 438 | 436 | 483 |
| Visual Observation | ◎ | ◎ | O | X | X | X |

TABLE 5

|  | Example | | | Comp. Ex. | | |
| --- | --- | --- | --- | --- | --- | --- |
|  | 9 | 10 | 11 | 7 | 8 | 9 |
| Ink Composition | G | H | I | g | h | i |
| Luminous Compound 1 | 1 |  |  |  |  |  |
| Luminous Compound 2 |  | 1 |  |  |  |  |
| Luminous Compound 3 |  |  | 1 |  |  |  |
| Comp. Ex. Compound 1 |  |  |  | 1 |  |  |

TABLE 5-continued

| | Example | | | Comp. Ex. | | |
|---|---|---|---|---|---|---|
| | 9 | 10 | 11 | 7 | 8 | 9 |
| Comp. Ex. Compound 2 | | | | | 1 | |
| Comp. Ex. Compound 3 | | | | | | 1 |
| Ethanol | 60 | 60 | 60 | 60 | 60 | 60 |
| Ethyl Acetate | 30 | 30 | 30 | 30 | 30 | 30 |
| Ethylene Glycol | 5 | 5 | 5 | 5 | 5 | 5 |
| Polyacrylate | 4 | 4 | 4 | 4 | 4 | 4 |
| Emission Intensity (%) | 206 | 254 | 100 | 0 | 0 | 0 |
| Emission Center Wavelength (nm) | 452 | 450 | 467 | 434 | 435 | 436 |
| Visual Observation | ⊚ | ⊚ | ○ | X | X | X |

What is claimed is:

1. A blue luminous ink composition comprising the luminous compound represented by the formula:

(I)

wherein $R^1$ is a group selected from the group consisting of a hydrogen atom, an alkyl group having from 1 to 4 carbon atoms, an alkoxyl group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 4 carbon atoms, a substituted or unsubstituted aralkyl group having from 7 to 10 carbon atoms and a substituted or unsubstituted aryl group having from 6 to 12 carbon atoms, M is a two-valent or three-valent metal, provided rare-earth metal and alkaline earth metal (IIa group) are eliminated, and n is an integer of 2 or 3.

2. The blue luminous ink composition according to claim 1 wherein the three-valent metal is the IIIb group metal in the periodic table.

3. The blue luminous ink composition according to claim 1 wherein the two-valent or three-valent metal is aluminium, indium, or zinc.

4. The blue luminous ink composition according to claim 1 wherein the luminous compound is contained in an amount of 0.01 to 5% by weight based on the total amount of the ink composition.

5. The blue luminous ink composition according to claim 1 wherein the R is perfluoroalkyl group having 1 to 10 carbon atoms.

6. The blue luminous ink composition according to claim 1 further comprising a solvent soluble resin selected from the group consisting of a polyvinyl resin, a polyamine resin and a polyacrylate resin.

7. The blue luminous ink composition according to claim 1 having a fluorescent emission center wavelength of 450 to 480 nm.

* * * * *